US012420290B2

(12) United States Patent
Miyamoto et al.

(10) Patent No.: US 12,420,290 B2
(45) Date of Patent: Sep. 23, 2025

(54) METHOD FOR REMOVING METALLIC FOREIGN MATTER FROM FLUORORESIN AND METHOD FOR PRODUCING FLUORORESIN WITH REDUCED METALLIC FOREIGN MATTER

(71) Applicants: DAIKIN INDUSTRIES, LTD., Osaka (JP); Daikin Fluorochemicals (China) Co., Ltd., Jiangsu (CN)

(72) Inventors: Masayoshi Miyamoto, Osaka (JP); Hiroyuki Sendan, Osaka (JP); Kouichi Hirota, Osaka (JP); Makoto Kawamorita, Osaka (JP); Tsunehiko Fuwa, Jiangsu (CN)

(73) Assignees: DAIKIN INDUSTRIES, LTD., Osaka (JP); DAIKIN FLUOROCHEMICALS (CHINA) CO., LTD., Jiangsu (CN)

( * ) Notice: Subject to any disclaimer, the term of this patent is extended or adjusted under 35 U.S.C. 154(b) by 0 days.

(21) Appl. No.: 18/507,699

(22) Filed: Nov. 13, 2023

(65) Prior Publication Data

US 2024/0075481 A1 Mar. 7, 2024

Related U.S. Application Data

(63) Continuation of application No. PCT/JP2022/020540, filed on May 17, 2022.

(30) Foreign Application Priority Data

May 20, 2021 (CN) .......................... 202110549939.3

(51) Int. Cl.
B03C 1/32 (2006.01)

(52) U.S. Cl.
CPC ....................................... *B03C 1/32* (2013.01)

(58) Field of Classification Search
CPC ......................................................... B03C 1/32
(Continued)

(56) References Cited

U.S. PATENT DOCUMENTS 2,062,545 A * 12/1936 Weis ...................... B03C 1/025
209/225
4,778,594 A * 10/1988 Doctor ................... B03C 1/035
209/232

(Continued)

FOREIGN PATENT DOCUMENTS

| CN | 102245653 A | 11/2011 |
| CN | 105983479 A | 10/2016 |

(Continued)

OTHER PUBLICATIONS

International Preliminary Report on Patentability dated Nov. 21, 2023 with a Translation of the Written Opinion of the International Searching Authority in Application No. PCT/JP2022/020540.

(Continued)

*Primary Examiner* — Terrell H Matthews
(74) *Attorney, Agent, or Firm* — Sughrue Mion, PLLC

(57) ABSTRACT

A method for removing metallic foreign matter from a fluororesin and a method for producing a fluororesin with reduced metallic foreign matter, which methods include applying a magnetic field to a fluororesin with a magnet while dropping the fluororesin by gravity to thereby remove metal, wherein the methods provide a screen made of a magnetic material in a flow path of the fluororesin dropped by gravity, and when the fluororesin passes through the screen, the screen is not vibrated.

6 Claims, 1 Drawing Sheet

(58) Field of Classification Search
USPC .................................................... 209/1
See application file for complete search history.

(56) References Cited

U.S. PATENT DOCUMENTS

| | | | | |
|---|---|---|---|---|
| 5,333,797 | A * | 8/1994 | Becker | ..................... B07B 4/02 241/24.22 |
| 8,534,465 | B2 * | 9/2013 | Funk | ......................... C08J 3/12 209/225 |
| 2011/0251353 | A1 * | 10/2011 | Funk | .................... C08F 220/06 525/329.7 |

FOREIGN PATENT DOCUMENTS

| | | | |
|---|---|---|---|
| EP | 1 422 257 | A1 | 5/2004 |
| EP | 1 535 933 | A1 | 6/2005 |
| JP | 54-071155 | A | 6/1979 |
| JP | 04-074546 | A | 3/1992 |
| JP | 2003-137922 | A | 5/2003 |
| JP | 2005-21761 | A | 1/2005 |
| JP | 2005-66952 | A | 3/2005 |
| JP | 2005-263985 | A | 9/2005 |
| JP | 3993797 | B2 * | 10/2007 .............. B01J 20/26 |
| JP | 2011005397 | A * | 1/2011 |
| JP | 2013-043911 | A | 3/2013 |
| JP | 2017-35670 | A | 2/2017 |
| WO | 2004/009653 | A1 | 1/2004 |

OTHER PUBLICATIONS

International Search Report for PCT/JP2022/020540 dated Jul. 19, 2022 [PCT/ISA/210].

Extended European Search Report dated Oct. 22, 2024 for corresponding EP Application No. 22804685.0.

* cited by examiner

METHOD FOR REMOVING METALLIC FOREIGN MATTER FROM FLUORORESIN AND METHOD FOR PRODUCING FLUORORESIN WITH REDUCED METALLIC FOREIGN MATTER

CROSS-REFERENCE TO RELATED APPLICATIONS

This application is a Rule 53 (b) Continuation of International Application No. PCT/JP2022/020540 filed May 17, 2022, which claims priority from Chinese Patent Application No. 202110549939.3 filed May 20, 2021, the respective disclosures of which are incorporated herein by reference in their entirety.

TECHNICAL FIELD

The present disclosure relates to a method for removing metallic foreign matter from a fluororesin and a method for producing a fluororesin with reduced metallic foreign matter.

BACKGROUND ART

Fluororesin is used in a wide variety of applications. Fluororesin, however, may be contaminated with metallic foreign matter resulting from rubbing or corrosion of manufacturing facilities. Removing metallic foreign matter from a fluororesin containing metallic foreign matter is an important issue.

Patent Literatures 1 and 2 disclose removing a tiny amount of metallic foreign matter from a resin using a magnet.

Patent Literature 3 discloses separating and collecting fluorine-containing resin powder using a liquid medium containing chlorofluoroalkane and an aqueous liquid medium.

Patent Literature 4 discloses removing foreign matter from a fluororesin using a solvent.

CITATION LIST

Patent Literature

Patent Literature 1: Japanese Patent Laid-Open No. 2005-263985
Patent Literature 2: Japanese Patent Laid-Open No. 2005-21761
Patent Literature 3: Japanese Patent Laid-Open No. 54-071155
Patent Literature 4: International Publication No. WO 2004/009653

SUMMARY

Technical Problem

An object of the present disclosure is to provide a method for suitably removing metallic foreign matter from a fluororesin and a method for producing a fluororesin with reduced metallic foreign matter, including the method for removing metallic foreign matter from a fluororesin as one of the steps.

The present disclosure is a method for removing metallic foreign matter from a fluororesin, comprising applying a magnetic field to a fluororesin with a magnet while dropping the fluororesin by gravity, to remove metal.

Advantageous Effects of Invention

The method of the present disclosure for removing metallic foreign matter from a fluororesin can efficiently and precisely remove metallic foreign matter at low cost. Consequently, when the resulting resin is checked for metallic foreign matter, the amount of resin treated as rejected lot can be reduced, and a fluororesin with low metallic foreign matter content can be efficiently provided.

DESCRIPTION OF EMBODIMENTS

Figure 1:
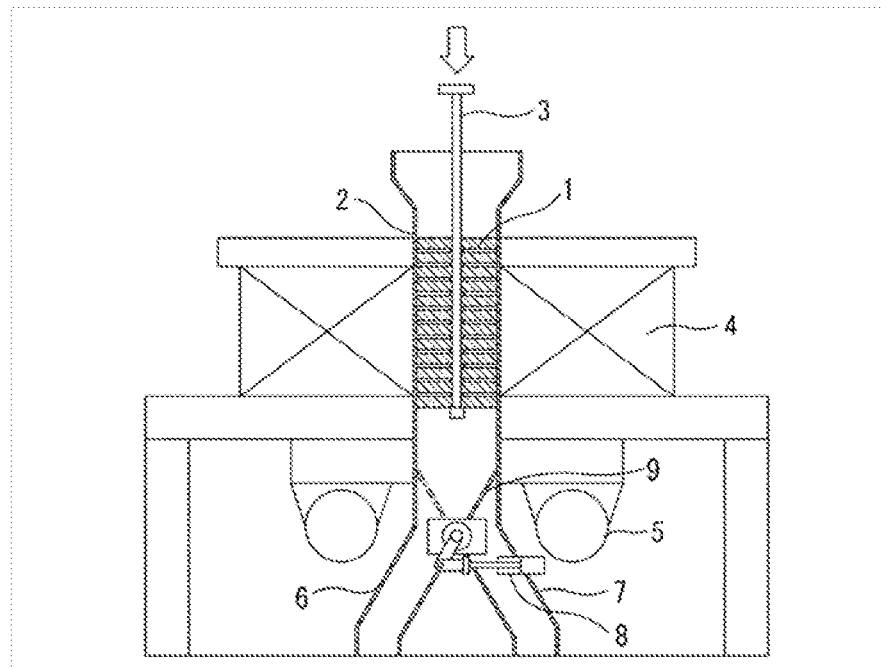
FIG. 1 is an exemplified view of an apparatus used in the present invention.

The present disclosure will now be described in detail. The present disclosure is about a method for removing metal from a fluororesin. The fluororesin used herein is not limited. Specific examples of the fluororesin include PTFE resin, PFA resin, FEP resin, ETFE resin, PCTFE resin, and PVDF resin. Among these resins, PTFE resin is particularly preferable. The fluororesin is preferably solid and the disclosed method may be applied to any form, such as powder, granulated products, and pellets.

The metal in such a fluororesin may be present in a metal powder or the like by itself or in an integrated form with the fluororesin. In the present disclosure, foreign matter is removed by magnetic force. Accordingly, the disclosure enables suitable removal even from an integrated material of metal and a fluororesin, which makes the removal more difficult. Examples of metals that can be mixed as foreign matter include stainless steel, iron, and these metals mixed with other elements.

In the present disclosure, the metal in a fluororesin is mainly a contaminant that is foreign matter resulting from rubbing, corrosion, or the like of manufacturing facilities and does not occur at a high rate. However, such foreign matter, if once occurs, causes defective products in various applications. Desirably, foreign matter can be removed with as high accuracy as possible.

The present disclosure features applying a magnetic field to a fluororesin with a magnet while dropping the fluororesin by gravity, thereby removing metal. When a large amount of fluororesin surrounds metallic foreign matter, the surrounding fluororesin may obstruct the magnetic force and thus interfere with sufficient removal of the foreign matter.

For example, when a magnetic force is applied to a fluororesin being moved in a horizontal direction using a roller, a conveyor, or the like, the metallic foreign matter attached to the fluororesin may not be removed sufficiently by the magnetic force. Also, the fluororesin is removed to some extent together with the foreign matter. This is the problem that a certain percentage of fluororesin is always lost during operation.

In contrast, when a magnetic field is applied to a fluororesin while the fluororesin is being dropped by gravity, the fluororesin in the form of a dispersion in the air is subjected to the magnetic field application. The magnetic field applied to the fluororesin being dropped by gravity sufficiently reaches the metal. This action of the magnetic field enables suitable removal. Such magnetic field application is also preferable from the viewpoint of continuous processing. Additionally, it has the advantage that the loss of fluororesin is not as high as when a roller or a conveyor is used. More specifically, in the method of the present disclosure, the loss of fluororesin is a small amount of fluororesin removed due to attachment to a screen used as a filter when the screen is washed for inspection or the like.

The magnet used in the present disclosure may be an electromagnet or a permanent magnet.

Electromagnets are more preferable in that they can apply a stronger magnetic field. Also, electromagnets are preferable from the viewpoint of enabling foreign matter to be easily removed by disconnecting the power supply during washing. Although permanent magnets are used as well, using an electromagnet is more preferable in view of foreign matter removal efficiency because permanent magnets are low in magnetic force, require large intervals for placing the magnets, and have difficulty in removing attached foreign matter during cleaning.

The magnetic force applied to a fluororesin is preferably 0.8 T or more and more preferably 1.2 T or more. Treatment in such a high range of magnetic force is particularly preferable in view of the ability to remove fine metal.

In some embodiments, a screen made of a magnetic material is set in the space through which the fluororesin falls. The screen thus provided is given magnetism by the electromagnet, thus serving to remove metallic foreign matter. Also, metallic foreign matter attached to the screen can be easily removed by turning off the electromagnet for cleaning, and thus, using such a screen is preferable.

The screen may be made of a permanent magnet. Such a screen, which has magnetism derived from the permanent magnet, can produce the same effect.

The screen may have any shape without limitation and may be, for example, a screen with an opening size of 5 mm or a honeycomb or micro-pitch screen.

The method of the present disclosure for removing metallic foreign matter will be specifically further described in detail below with reference to FIG. 1.

In some embodiments of the removing method of the present disclosure, the path through which the fluororesin falls by gravity is provided with some metal screens.

FIG. 1 illustrates an electromagnetic separator in which screens are set. One or more screens 1 made of a magnetic material are held by a holding rod 3 in the vertical direction in a multilayer manner in the hollow of a tube 2 open at the upper and lower ends. For example, the tube 2 may be located in the center of an electromagnet 4 and provided with a vibrator 5 at a lower portion of the tube 2. The vibrator 5 is optional and may not necessarily be provided.

In particular, the vibrator 5 is preferably not used for fluororesin in a powder form. If a vibrator is used, the fluororesin trapped in the gap may be broken into flakes or aggregated resin particles, or rubbing by vibration may cause new metal debris. Thus, it is preferable not to use a vibrator.

The tube may be connected to a product outlet and a magnetic foreign matter outlet at a lower portion of the tube. In this instance, the product outlet and the magnetic foreign matter outlet may be switched by turning a damper with a cylinder.

A fluororesin containing magnetic foreign matter is fed into the interior of the tube 2 through the upper end and dropped in the direction indicated by the arrow in FIG. 1. The magnetic foreign matter is magnetically attached to the screens magnetized by the magnet 4. After passing through the screens, the product from which magnetic foreign matter is removed is discharged through the lower end of the tube 2. In some embodiments using an electromagnet as the magnet, the electromagnet may be turned off to demagnetize the screens and remove magnetic foreign matter attached to the screens for cleaning. Also, if necessary, the screens 1 may be taken out using the holding rod and cleaned to remove the magnetic foreign matter. The cleaned screens can be loaded back into the tube.

Figure 2:
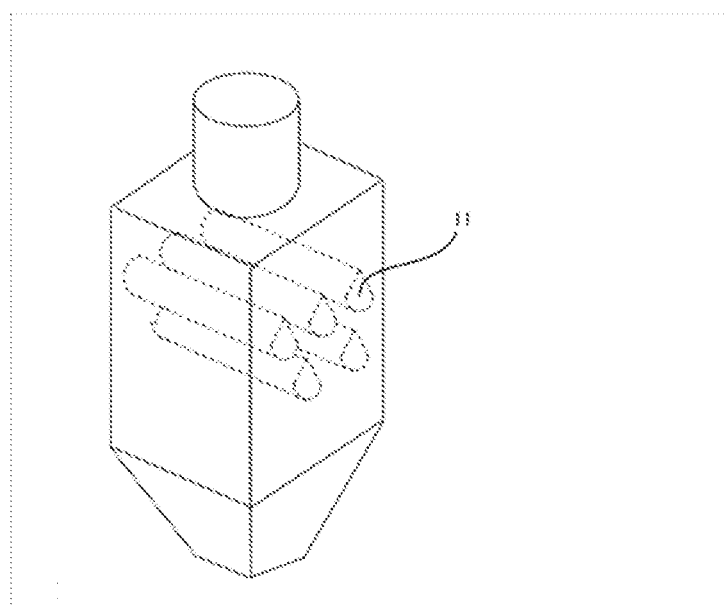
FIG. 2 is an exemplified view of an apparatus used in the present invention.

The embodiment depicted in FIG. 2 will also be described as another embodiment different from that in FIG. 1.

FIG. 2 illustrates an apparatus for removing magnetic foreign matter by bringing at least one droplet-shaped magnet to contact with a fluororesin containing magnetic foreign matter.

A droplet-shaped magnet 11 has a shape forming a semi-circular arc portion downward and a triangular portion upward, as depicted in FIG. 2. While the fluororesin is falling along the slopes of the triangular shape, the magnet removes the foreign matter.

Preferably, a plurality of droplet-shaped magnets is arranged with yokes therebetween. Such an apparatus, depicted in FIG. 2, also can remove magnetic foreign matter.

The present disclosure is about not only the above-described method for removing metallic foreign matter from a fluororesin but also a method for producing a fluororesin with reduced metallic foreign matter, including a similar step of removing metallic foreign matter.

Hence, various methods can be applied to obtain a "fluororesin with reduced metallic foreign matter."

The present disclosure provides a novel method for obtaining a "fluororesin with reduced metallic foreign matter."

The method of the present disclosure for producing a fluororesin with reduced metallic foreign matter includes the step of removing metallic foreign matter from a fluororesin by the above-described method. "The step of removing metallic foreign matter" mentioned herein can be the same as the method described above.

The method of the present disclosure for producing a fluororesin with reduced metallic foreign matter may further include another step of removing metallic foreign matter other than the above-described step.

In the method of the present disclosure for removing metallic foreign matter, the lower the throughput rate, the better. More specifically, treating a large amount of fluororesin in a short time is undesirable in view of difficulty in sufficiently removing metallic foreign matter.

EXAMPLES

The present disclosure will now be specifically described with reference to Examples. In the following Examples, "part (s)" and "%" are "part (s) by weight" and "% by weight," respectively, unless otherwise specified.

Examples 1 to 3

PTFE granulated powder (POLYFLON PTFE M-392 produced by Daikin Industries, Ltd.) into which 500 ppm of 316L stainless steel powder (SUS 316L powder, 150 μm pass, produced by Kojundo Chemical Laboratory Co., Ltd.) was added was prepared as a sample.

For each test, 5 kg of the PTFE granulated powder containing the stainless steel powder thus prepared was used.

The apparatus used was an electromagnetic separator (model CG-180X-1) manufactured by Nippon Magnetics, Inc. An electromagnet was used as the magnet. Additionally, the screen in the apparatus was made of a magnetic material.

Each Example was tested under varying conditions, such as the throughput rate and the presence or absence of a vibrator, as presented in Table 1 below.

The results in Table 1 clearly show that better results were obtained without vibration.

(Measurement Method of Residual Stainless Steel Percentage)

A weighing paper is wound around a 15,000 G bar magnet without gaps and fixed with tape. The resulting bar magnet is secured by a clamp. The powder subject to the measurement is poured over the bar magnet. The throughput rate as a guide is 4 kg/h. After the completion of pouring the powder, the collected powder is poured over the bar magnet again. Through such operation, the metal in the powder is attached to the magnet.

Then, with the bar magnet placed on a heat-resistant metal container, the tape fixing the weighing paper is removed, and the weighing paper is removed from the bar magnet. Thus, the metal attached to a metal falls into the heat-resistant metal container.

This heat-resistant metal container is placed in an electric furnace at 600° C. and removed in 2 hours. After air cooling, the container was weighed. The amount of the metal contained was determined by subtracting the weight of the empty container from the measured value.

The value calculated as the proportion of the amount of the metal measured as described above to the amount of the stainless steel powder added to the sample is presented in Table 1 as the residual stainless steel percentage.

TABLE 1

|  | Example 1 | Example 2 | Example 3 |
| --- | --- | --- | --- |
| Screen | Opening size: 5 mm | Opening size: 5 mm | Opening size: 5 mm |
| Throughput rate (kg/h) | 600 | 200 | 600 |
| Magnetic flux density (T) | 1.5 | 1.5 | 1.5 |
| With/without vibrator | With | With | Without |
| Residual stainless steel percentage (%) | 17.8 | 15.1 | 7.8 |

The results of the above Examples clearly show that the method of the present disclosure for removing metallic foreign matter can suitably remove foreign matter from a fluororesin.

(Process for Producing PFA Powder)

An autoclave (capacity: 174 L) subjected to glass lining and equipped with a stirrer was charged with 26.6 kg of pure water. After the interior of the autoclave was sufficiently purged with $N_2$ and evacuated to a vacuum, the autoclave was charged with 30.4 kg of perfluorocyclobutane [C-318], 0.8 kg of methanol, and 1.6 kg of perfluoro (propyl vinyl ether) [PPVE]. Then, the interior of the autoclave was kept at 35° C. while being stirred, and tetrafluoroethylene [TFE] was injected into the autoclave to an inner pressure of 0.58 MPaG. Polymerization was started by adding 0.028 kg of 50% solution of di-n-propyl peroxydicarbonate [NPP] in methanol as a polymerization initiator. Since the pressure decreases as the polymerization proceeds, TFE and PPVE were continuously added in a proportion that could result in the desired polymer composition.

33 hours after starting the polymerization, the stirring was stopped, and simultaneously, unreacted monomers and C-318 were discharged to stop the polymerization. The white powder in the autoclave was washed with water and dried at 150° C. for 12 hours to yield a polymer product.

Examples 4 and 5

To the PFA powder obtained by the above-described process, 500 ppm of 316L stainless steel powder (SUS 316L powder, 150 µm pass, produced by Kojundo Chemical Laboratory Co., Ltd.) was added to prepare a sample.

For each test, 1 kg of the PFA powder containing the stainless steel powder thus prepared was used.

The apparatus used was a lattice magnet with a housing (neodymium-based rare earth magnet, whose magnet is a permanent magnet) manufactured by Magnetec Japan Ltd.

TABLE 2

|  | Example 4 | Example 5 |
| --- | --- | --- |
| Shape | Droplet-shaped | Droplet-shaped |
| Throughput rate (kg/h) | 300 | 200 |
| Magnetic flux density (T) | 1.4 | 1.4 |
| With/without vibrator | Without | Without |
| Residual stainless steel percentage (%) | 27.9 | 23.0 |

The results of the above Examples clearly show that the method of the present disclosure for removing metallic foreign matter can suitably remove foreign matter from a fluororesin.

INDUSTRIAL APPLICABILITY

The removing method of the present disclosure can suitably remove metallic foreign matter from a fluororesin.

REFERENCE SIGNS LIST

1: screen
2: tube
3: holding rod
4: electromagnet
5: vibrator
6: product outlet
7: iron powder outlet
8: cylinder
9: damper
11: droplet-shaped magnet

What is claimed is:

1. A method for removing metallic foreign matter from a fluororesin, the method comprising:
   applying a magnetic field to a fluororesin containing the metallic foreign matter with a magnet while dropping the fluororesin by gravity to thereby remove metal,
   wherein the method provides a screen made of a magnetic material in a flow path of the fluororesin dropped by gravity,
   the fluororesin is dropped from a position above the screen in a vertical direction and travels toward the screen by gravity, the metallic foreign matter becomes magnetically attached to the screen, and the fluororesin from which the metallic foreign matter has been removed passes through the screen and is discharged from a position below the screen in the vertical direction, and
   when the fluororesin passes through the screen, the screen is not vibrated.

2. The method for removing metallic foreign matter from a fluororesin according to claim 1, wherein the magnet is an electromagnet.

3. The method for removing metallic foreign matter from a fluororesin according to claim 1,
   wherein the fluororesin is a powder, a pellet, or a granulated product.

4. A method for producing a fluororesin with reduced metallic foreign matter, comprising a step of applying a magnetic field to a fluororesin with a magnet while dropping the fluororesin by gravity to thereby remove metal,
   wherein the method provides a screen made of a magnetic material in a flow path of the fluororesin dropped by gravity,
   the fluororesin is dropped from a position above the screen in a vertical direction and travels toward the screen by gravity, the metallic foreign matter becomes magnetically attached to the screen, and the fluororesin from which the metallic foreign matter has been removed passes through the screen and is discharged from a position below the screen in the vertical direction, and
   when the fluororesin passes through the screen, the screen is not vibrated.

5. The method for producing a fluororesin according to claim 4, wherein the magnet is an electromagnet.

6. The method for producing a fluororesin according to claim 4, wherein the fluororesin is a powder, a pellet, or a granulated product.

\* \* \* \* \*